United States Patent
Mizutani et al.

(10) Patent No.: US 10,978,110 B2
(45) Date of Patent: Apr. 13, 2021

(54) IMAGE RECORDING APPARATUS AND CONTROL METHOD THEREOF

(71) Applicant: CANON KABUSHIKI KAISHA, Tokyo (JP)

(72) Inventors: Hitoshi Mizutani, Tokyo (JP); Noboru Omori, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/368,679

(22) Filed: Mar. 28, 2019

(65) Prior Publication Data

US 2019/0304509 A1    Oct. 3, 2019

(30) Foreign Application Priority Data

Mar. 30, 2018 (JP) .............................. JP2018-069287
Nov. 20, 2018 (JP) .............................. JP2018-217583

(51) Int. Cl.
| | |
|---|---|
| *G11B 27/34* | (2006.01) |
| *H04N 5/77* | (2006.01) |
| *G11B 27/30* | (2006.01) |
| G11B 27/031 | (2006.01) |

(52) U.S. Cl.
CPC .............. *G11B 27/34* (2013.01); *G11B 27/30* (2013.01); *H04N 5/772* (2013.01)

(58) Field of Classification Search
USPC ........ 386/223–224, 230, 239–248, 278–290, 386/343–352
See application file for complete search history.

(56) References Cited

U.S. PATENT DOCUMENTS

| | | | | |
|---|---|---|---|---|
| 6,564,002 B1 * | 5/2003 | Murakami | ........... | G11B 27/002 386/201 |
| 7,024,095 B1 * | 4/2006 | Kondou | ............... | G11B 27/034 386/279 |
| 2003/0026592 A1 * | 2/2003 | Kawahara | ............ | G11B 27/031 386/281 |
| 2003/0219223 A1 * | 11/2003 | Shinkai | ................ | G11B 27/031 386/241 |

(Continued)

FOREIGN PATENT DOCUMENTS

| | | |
|---|---|---|
| CN | 1717031 A | 1/2006 |
| CN | 101055744 A | 10/2007 |
| JP | 2016167788 A | 9/2016 |

*Primary Examiner* — Hung Q Dang

(74) *Attorney, Agent, or Firm* — Canon U.S.A., Inc. IP Division (57) ABSTRACT

An image recording apparatus can record an appropriate reel number and an appropriate camera identification (ID) in a volume label of a recording medium even in a case where a management file is generated for each moving image format. In a case where a management file of a first moving image format set as a recording format of a moving image file is not recorded, and a management file of another moving image format is recorded in a recording medium, the image recording apparatus determines a reel number of the recording medium based on information about the reel number included in the management file of the another moving image format and records the management file of the first moving image format including the information about the determined reel number in the recording medium, and does not update or record the volume label in the recording medium.

13 Claims, 4 Drawing Sheets

(56) References Cited

U.S. PATENT DOCUMENTS

| | | | |
|---|---|---|---|
| 2004/0141723 A1* | 7/2004 | Sakano | G11B 27/032 386/247 |
| 2004/0218902 A1* | 11/2004 | Yanagita | G11B 27/032 386/248 |
| 2006/0112124 A1* | 5/2006 | Ando | G11B 27/034 |
| 2009/0047002 A1* | 2/2009 | Morimoto | H04N 9/7921 386/335 |
| 2010/0129066 A1* | 5/2010 | Maeda | H04N 5/772 386/334 |
| 2011/0038598 A1 | 2/2011 | Okuda et al. | |

* cited by examiner

IMAGE RECORDING APPARATUS AND CONTROL METHOD THEREOF

BACKGROUND

Field of the Disclosure

The present disclosure relates to an image recording apparatus.

Description of the Related Art

In a video camera such as a digital cinema camera serving as an image recording apparatus, according to a customary practice of image capturing operation using a film, setting of a reel number uniquely associated with a recording medium is executed before or at the time of image capturing operation in order to smoothly execute data management or post-production data management. In the technique discussed in Japanese Patent Application Laid-Open No. 2016-167788, in order to use the set reel number as an index of imaging contents, the reel number is recorded in a management file in which information about the imaging contents (e.g., file name) is recorded. When reproduction is executed, the reel number set to the recording medium can be identified by reading out the information about the reel number from the recording medium. In order to execute data management of the imaging contents, the reel number is used together with the date or the camera name. At this time, a plurality of reel numbers exists in the same recording medium, which is an unacceptable issue because operability of data management can be lowered.

A camera identification (ID) may be set as identification information for identifying a video camera used for image capturing operation and used as a file name of a management file or imaging contents. The camera ID may be changed when a video camera used for image capturing operation is changed, or may be changed by a user through a menu setting. In a case where one recording medium is used by different video cameras or used in different camera ID settings, differing from the reel number, files having different camera IDs may exist in the same recording medium.

At an image capturing site where image capturing operation is executed by using a plurality of video cameras and a plurality of recording media, there is a demand for easily identifying a camera ID and a reel number from a volume label of a recording medium in order to smoothly execute data management or post-production data management. If a camera ID and a reel number can be identified from a volume label of a recording medium, a user can manage the recording medium without checking contents of a management file or imaging contents when the user inserts the recording medium into a personal computer (PC).

Accordingly, there is a need for the camera ID identifiable from the volume label does not change even in a case where the user changes the camera ID or the video camera is changed, so that the user can identify the camera ID used when the first moving image format is recorded.

SUMMARY

When imaging contents are collectively managed by a management file in which attribute information of the imaging contents such, as a file name, is described, there is a demand for sorting purposes of use according to the moving image format. In a case where management files are generated in the same recording medium according to moving image formats, it is necessary to prevent management files which include reel numbers differently allocated to respective moving image formats from being generated in the same recording medium.

Even if the management files are to be generated and recorded in the same recording medium according to moving image formats, the same reel number be allocated to the management files if they are recorded in the same recording medium.

Therefore, the present disclosure is directed to an image recording apparatus capable of recording an appropriate reel number and appropriate identification information in a volume label of the recording medium even in a case where a management file is generated according to a moving image format.

According to an aspect of the present disclosure, there is provided an image recording apparatus. The image recording apparatus includes a setting unit configured to set a recording format of a moving image from among a plurality of recording formats, a determination unit configured to determine a reel number of a recording medium based on information retained in the image recording apparatus, and a recording control unit configured to execute control to generate a management file of the recording format set by the setting unit which includes information about the reel number determined by the determination unit and to record the management file in the recording medium, wherein, in a case where the management file of the recording format set by the setting unit is not recorded and a management file of another recording format is recorded in the recording medium, the recording control unit executes control to generate a management file of the recording format set by the setting unit which includes information about a reel number of the management file of the another recording format and to newly record the management file in the recording medium.

Further features of the present disclosure will become apparent from the following description of exemplary embodiments with reference to the attached drawings.

DESCRIPTION OF THE EMBODIMENTS

Figure 1:
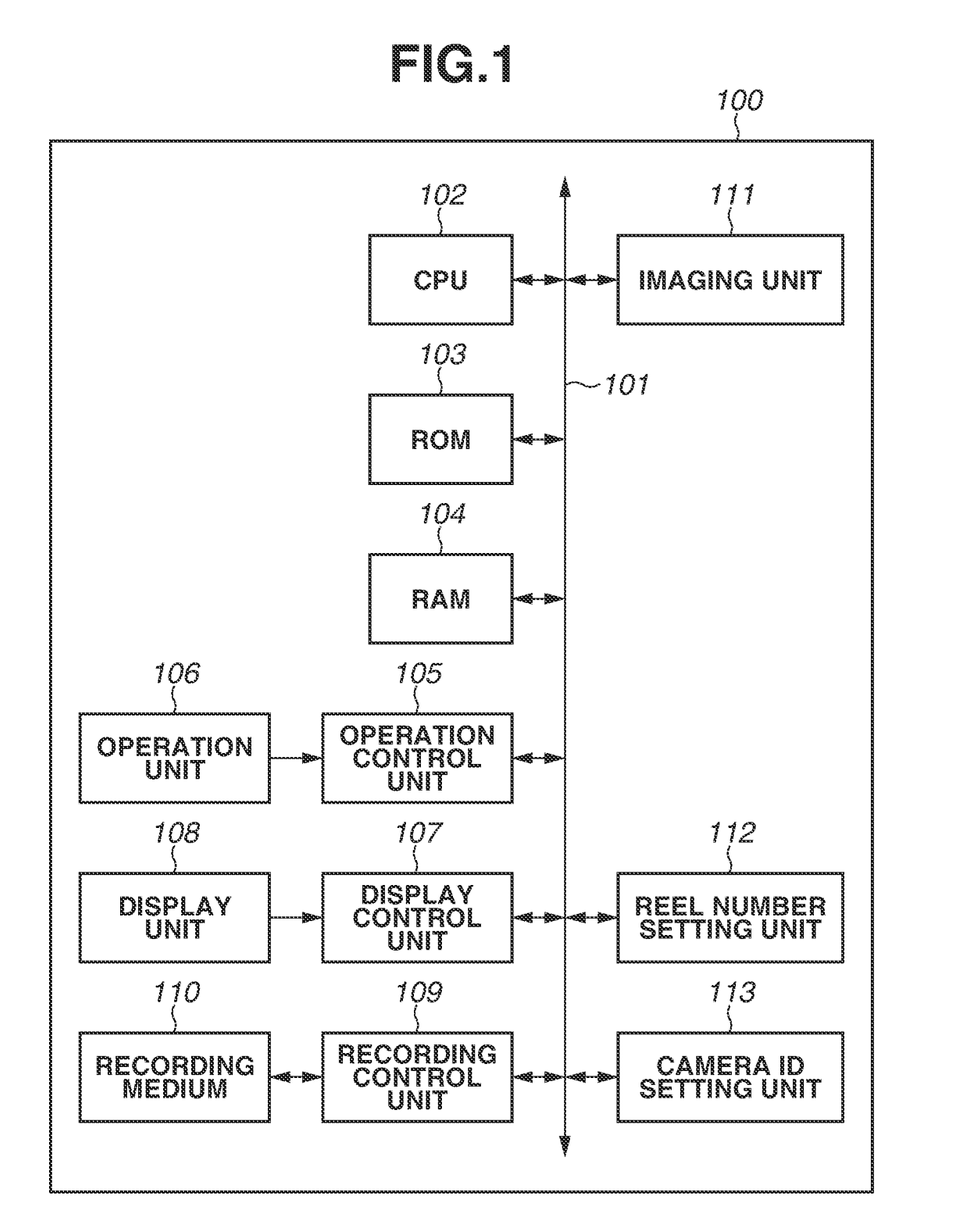
FIG. 1 is a block diagram illustrating an image recording apparatus.

FIG. 1 is a block diagram illustrating an example of an internal configuration of an image recording apparatus 100 according to the present exemplary embodiment. In the present disclosure, an imaging apparatus, such as a video camera, will be described as an example of the image recording apparatus 100. However, the present disclosure is also applicable to an apparatus or a system capable of recording a moving image in a recording medium. As illustrated in FIG. 1, the image recording apparatus 100 includes a bus 101, a central processing unit (CPU) 102, a read only memory (ROM) 103, a random access memory (RAM) 104, an operation control unit 105, an operation unit 106, a display control unit 107, a display unit 108, a recording control unit 109, a recording medium 110, an imaging unit 111, and a reel number setting unit 112.

The bus 101 includes an address bus, a data bus, and a control bus. The bus 101 is used for transmitting a command or data between constituting elements of the image recording apparatus 100.

The CPU 102 is a processor for reading a program stored in the ROM 103 and executing the read program to control each of the constituent elements of the image recording apparatus 100. The ROM 103 is a non-volatile memory which stores a program and various kinds of setting information. The RAM 104 is a volatile memory used as a work memory.

The display unit 108 includes a display device, such as a thin-film transistor (TFT) liquid crystal display. The display unit 108 displays a selection screen for setting a menu, a live-view image captured by the imaging unit 111, or an image recorded in the recording medium 110 on the TFT liquid crystal display to a user.

The display control unit 107 executes various kinds of image processing for outputting image data in an image format (i.e., aspect ratio) appropriate for the display unit 108.

The operation unit 106 includes a power button, a shutter button, a moving image recording button, and a cross key for executing selecting operation such as menu setting on a user interface (UI) screen displayed on the display unit 108. The operation unit 106 may be realized with a touch panel instead of physical buttons.

The operation control unit 105 detects user operation performed on the operation unit 106 and notifies the CPU 102 about the detected operation.

The recording medium 110 is a removable recording medium, such as a secure digital (SD) card. The recording medium 110 is inserted into the image recording apparatus 100 in order to record image data.

The recording control unit 109 is a control unit which executes writing or reading of data with respect to the recording medium 110. The recording control unit 109 receives a reading instruction notified from the CPU 102, sequentially reads a specified region in the recording medium 110 for each certain size, and loads and buffers the data in the RAM 104. Further, the recording control unit 109 receives a writing instruction notified from the CPU 102, receives the writing target data (e.g., image data or management data) loaded on the RAM 104, and sequentially writes the received data in the recording medium 110 for each certain size. Then, when reading or writing operation is completed, the recording control unit 109 notifies the CPU 102 about completion of the operation.

The imaging unit 111 includes an imaging lens, an image sensor, and an image processing circuit. First, incident light from an object through the imaging lens is focused on the image sensor, and a video signal is generated therefrom through photoelectric conversion. Then, various kinds of image processing is executed with respect to the generated image signal in the image processing circuit and thereby image data is generated. In a case where still image capturing is executed, the imaging unit 111 encodes the image data in a recording format, such as a Joint Photographic Experts Group (JPEG) format, to generate a still image file. In a case where moving image capturing is executed, the imaging unit 111 multiplexes moving image data encoded by a coding method, such as the standard of H.264/AVC, and audio data input from a microphone (not illustrated). Then, the imaging unit 111 formats the multiplexed data into a moving image format set as a recording format to generate a moving image file. In order to write the generated image file into the recording medium 110, the CPU 102 issues a writing instruction.

The reel number setting unit 112 changes a setting value of the reel number recorded in the ROM 103. As an initial setting value of the reel number, "001" is recorded in the ROM 103. According to selecting operation performed on the operation unit 106 by the user and notified from the CPU 102, the reel number setting unit 112 changes the setting value of the reel number recorded in the ROM 103. On the menu setting screen, the user can change the setting value of the reel number by initializing the reel number or selecting a value for the reel number (e.g., "007") to be recorded in the recording medium next time.

The camera ID setting unit 113 changes a setting value of the camera ID recorded in the ROM 103. As an initial setting value of the camera ID, "A" is recorded in the ROM 103. According to the selecting operation performed on the operation unit 106 by the user and notified from the CPU 102, the camera ID setting unit 113 changes the setting value of the camera ID recorded in the ROM 103. On the menu setting screen, the user can change the setting value of the camera ID by initializing the camera ID or selecting a value for the camera ID (e.g., "A") to be recorded in the recording medium next time.

In FIG. 1, the image recording apparatus 100 includes a plurality of blocks. Dedicated processing circuits can be used for the respective blocks, or a general-purpose processor can realize the respective blocks by reading a processing program from a ROM and executing processing based on the program. Alternatively, the plurality of blocks may be realized by a single processor.

A volume label and a management file recorded in the recording medium 110 by the image recording apparatus 100 in the present exemplary embodiment will be described with reference to FIGS. 4A and 4B.

Figure 4A:
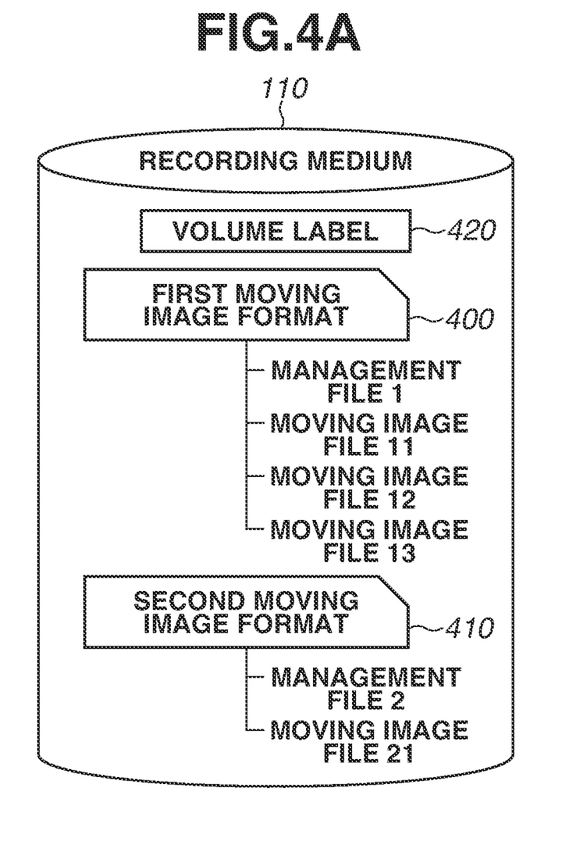
FIGS. 4A and 4B are schematic diagrams illustrating generation and recording processing of a management file executed by an image recording apparatus 100.

As illustrated in FIG. 4A, a volume label 420 is recorded in the recording medium 110. One volume label is recorded in the recording medium 110 even if a plurality of moving image formats exists therein.

A folder (i.e., a folder 400 of the first moving image format or a folder 410 of the second moving image format) and a management file (i.e., a management file 1 or 2) are recorded at each of the moving image formats (e.g., a material exchange format (MXF) file and a moving picture experts group phase 4 (MP4) file).

Figure 4B:
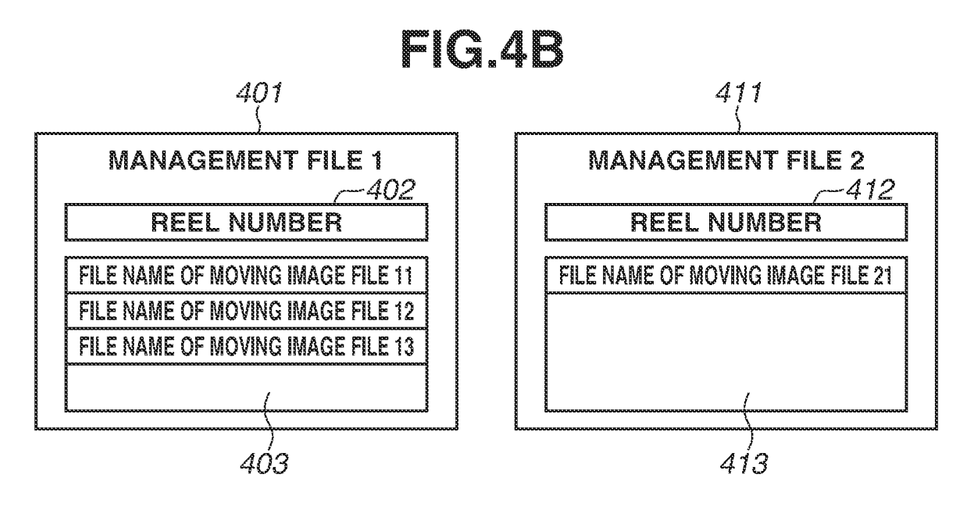

As illustrated in FIG. 4B, information about a reel number and information about a file name of a moving image file recorded in a folder the same as the folder in which the management file is recorded are described in the management file.

Moving image files 11, 12, and 13 are recorded in the folder 400 of the first moving image format. Thus, a reel number 402 and information 403 about moving image file recorded in the folder 400 of the first moving image format, i.e., respective file names of the moving image files 11, 12, and 13, are described in the management file 1.

A moving image file 21 is recorded in the folder 410 of the second moving image format. Thus, a reel number 412 and information 413 about a moving image file recorded in the folder 410 of the second moving image format, i.e., a file name of the moving image file 21, are described in the management file 2.

As described above, in the present exemplary embodiment, a management file is recorded for each moving image format, and information about a reel number is recorded in each management file, so that the reel number can be checked in any management file. Since the reel number is information uniquely associated with the recording medium, the same reel number has to be recorded in different management files recorded in the same recording medium.

A method of collectively creating and recording the management files of moving image formats recordable by the image recording apparatus can be considered as a method of recording the same reel number in different management files. Because management files are recorded collectively, information about the same reel number can be recorded easily. In this case, however, a management file is generated with respect to a moving image format in which the moving image file is not recorded, so that unnecessary data will be recorded. Since a management file is recorded even if data does not exist therein, the user may be confused when he or she checks the management file or confusion may arise when the management files are checked by another image recording apparatus.

Therefore, in the present exemplary embodiment, in a case where a management file of a moving image format of a moving image file to be recorded is not recorded in the recording medium 110, a management file including the information about a reel number is recorded on a recording medium when recording of the moving image file is actually executed.

Further, in a case where none of the management files of a recording-target moving image format and a non-recording target moving image format is recorded in the recording medium 110, a volume label including the information about a camera ID and a reel number is recorded in the recording medium 110 when recording of the moving image file is actually executed.

In a case where a management file of a moving image format other than the recording-target moving image format is recorded although a management file of the recording-target moving image format does not exist when the moving image file is to be recorded, the image recording apparatus 100 determines that a volume label which includes the information about a camera ID and a reel number is already recorded in the recording medium 110, and does not record the volume label again.

Generation and recording processing of the volume label and the reel number in the present exemplary embodiment will be described with reference to FIGS. 2 and 3. The CPU 102 executes control of respective blocks and various arithmetic operation based on the program read from the ROM 103 to execute the generation and recording processing.

Generation processing of a management file that is executed before recording is started will be described with reference to FIG. 2. First, in step S200, the CPU 102 determines whether a setting of the moving image format has been changed. Specifically, based on selecting operation performed on the operation unit 106 and notified from the operation control unit 105, the CPU 102 determines whether the user has changed the moving image format through the operation unit 106. If the CPU 102 determines that the moving image format has been changed (YES in step S200), the processing proceeds to step S201, and the processing illustrated in the flowchart in FIG. 2 is executed. In addition, when the power of the image recording apparatus 100 is ON or an operation mode thereof is set to an imaging mode, the processing in step S201 and subsequent steps will be executed even if the moving image format has not been changed.

In step S201, the CPU 102 inquires about whether a management file exists in the recording medium 110 attached to the image recording apparatus 100 via the recording control unit 109 and determines whether a management file exists (is recorded) in the recording medium 110. If the CPU 102 determines that the management file does not exist (is not recorded) in the recording medium 110 (NO in step S201), the processing proceeds to step S202. On the other hand, if the CPU 102 determines that the management file exists (is record) in the recording medium 110 (YES in step S201), the processing proceeds to step S204.

In step S202, the CPU 102 enables an update flag which indicates whether a setting value of the reel number recorded in the ROM 103 is to be updated when a management file is recorded, and stores the enabled update flag in the RAM 104. Then, the processing proceeds to step S212.

In step S212, the CPU 102 enables a volume label update flag which indicates whether a volume label is to be recorded when a management file is recorded, and stores the enabled volume label update flag in the RAM 104. Then, the processing proceeds to step S203. In the present exemplary embodiment, in a case where the update flag of the reel number is enabled in step S202, the volume label update flag is also enabled in step S212.

In step S203, the CPU 102 reads a setting value of the reel number previously recorded in the ROM 103 and sets the read reel number as a reel number to be recorded in a newly-generated management file.

In step S204, the CPU 102 disables the update flag which indicates whether a setting value of the reel number recorded in the ROM 103 is to be updated when a management file is recorded and stores the disabled update flag in the RAM 104. Then, the processing proceeds to step S213.

In step S213, the CPU 102 disables the volume label update flag which indicates whether a volume label is to be recorded when a management file is recorded and stores the disabled volume label update flag in the RAM 104. Then, the processing proceeds to step S205. In the present exemplary embodiment, in a case where the update flag of the reel number is disabled in step S204, the volume label update flag is also disabled in step S213.

In step S205, the CPU 102 acquires a setting of the moving image format currently set thereto and determines whether a management file of the currently-set moving image format as a recording target exists in the recording medium 110. If the management file of the moving image format as a recording target does not exist (NO in step S205), the processing proceeds to step S206. On the other hand, if the CPU 102 determines that the management file of the moving image format as a recording target exists (YES in step S205), the processing proceeds to step S209.

Herein, the processing proceeds to step S206 in a case where a management file of a moving image format other than the recording target moving image format is recorded although the management file of the recording-target moving image format does not exist in the recording medium 110 attached to the image recording apparatus 100. Further, the processing proceeds to step S209 in a case where the management file of the recording-target moving image format exists in the recording medium 110 attached to the image recording apparatus 100. Furthermore, the processing proceeds to step S202 in a case where no management file exists in the recording medium 110 attached to the image recording apparatus 100.

In step S206, the CPU 102 reads a management file of a moving image format other than the recording target moving image format from the recording medium 110 and loads the management file on the RAM 104. Next, in step S207, the CPU 102 analyzes the management file loaded on the RAM 104 in step S206 and acquires a reel number recorded in the management file of the moving image format as a non-recording target. Then, the processing proceeds to step S208. The management file read in step S206 will not be used unless setting of the moving image format is changed, so that this management file can be deleted from the RAM 104.

In step S208, as a reel number to be recorded in the management file of the recording-target moving image format, the CPU 102 stores, in the RAM 104, the reel number acquired from the management file of the non-recording target moving image format.

In step S209, the CPU 102 reads a management file of the recording-target moving image format from the recording medium 110, loads the management file on the RAM 104, and ends the generation processing of the management file executed before recording is started. In other words, in a case where the management file of the recording-target moving image format exists in the recording medium 110 attached to the image recording apparatus 100, meaning that a management file of the recording-target moving image format has been already recorded therein, so that a new management file is not generated.

In a case where the management file of the recording-target moving image format is not recorded and a new management file is to be generated, the processing in step S210 and subsequent step will be executed.

In step S210, in order to generate a management file of the recording-target moving image format, the CPU 102 reads a template of the management file recorded in the ROM 103 and loads the template on the RAM 104. In other words, a management file which does not include information about a moving image file or information about a reel number is generated in the RAM 104.

In step S211, the CPU 102 updates the information about the reel number of the management file loaded on the RAM 104 with the reel number set in step S203 or S208. In other words, a new management file including the information about a reel number is generated and temporarily stored in the RAM 104 before recording of the moving image file is started.

As described above, when no management file is recorded, the CPU 102 updates the volume label and generates by a generation unit a new management file of the recording-target moving image format using a setting value of the reel number previously recorded in the ROM 103 as a reel number. Then, in a case where the management file of the recording-target moving image format does not exist and a management file of a moving image format other than the recording-target moving image format is recorded, the CPU 102 does not update the volume label and generates a new management file of the recording-target moving image format using the reel number recorded in the management file of the other moving image format.

Subsequently, a flow of volume label recording processing and a flow of management file generation/recording processing, executed when recording of a moving image file is executed, will be described with reference to FIG. 3.

Figure 3:
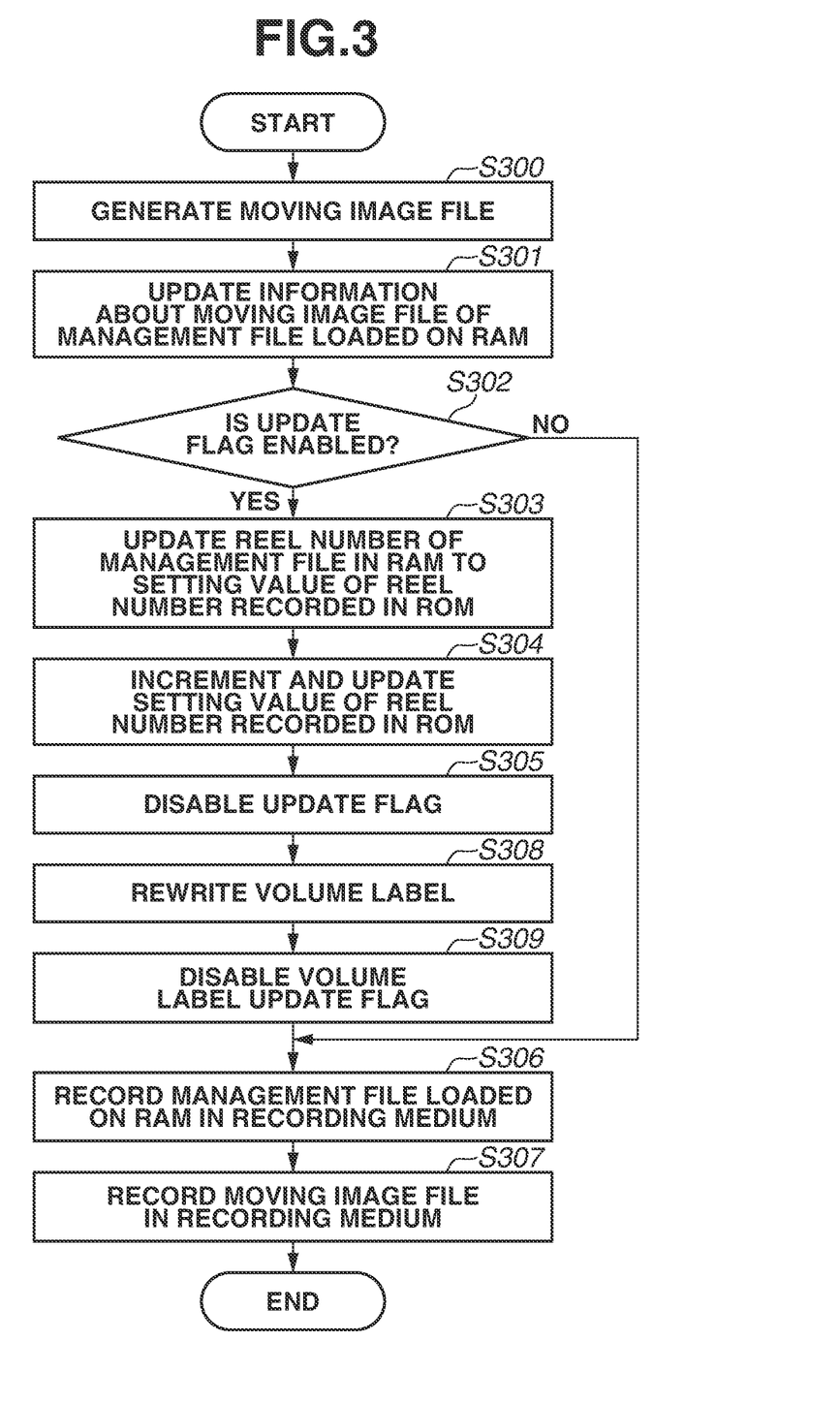
FIG. 3 is a flowchart illustrating generation and recording processing of a management file executed when recording of a moving image is executed.

The processing in FIG. 3 will be started when the operation control unit 105 notifies the CPU 102 that the user has operated the operation unit 106 to input an instruction for starting recording of a moving image.

In step S300, the imaging unit 111 captures a moving image, executes various kinds of image processing and compression processing, generates a moving image file, and stores the moving image file in the RAM 104.

Figure 2:
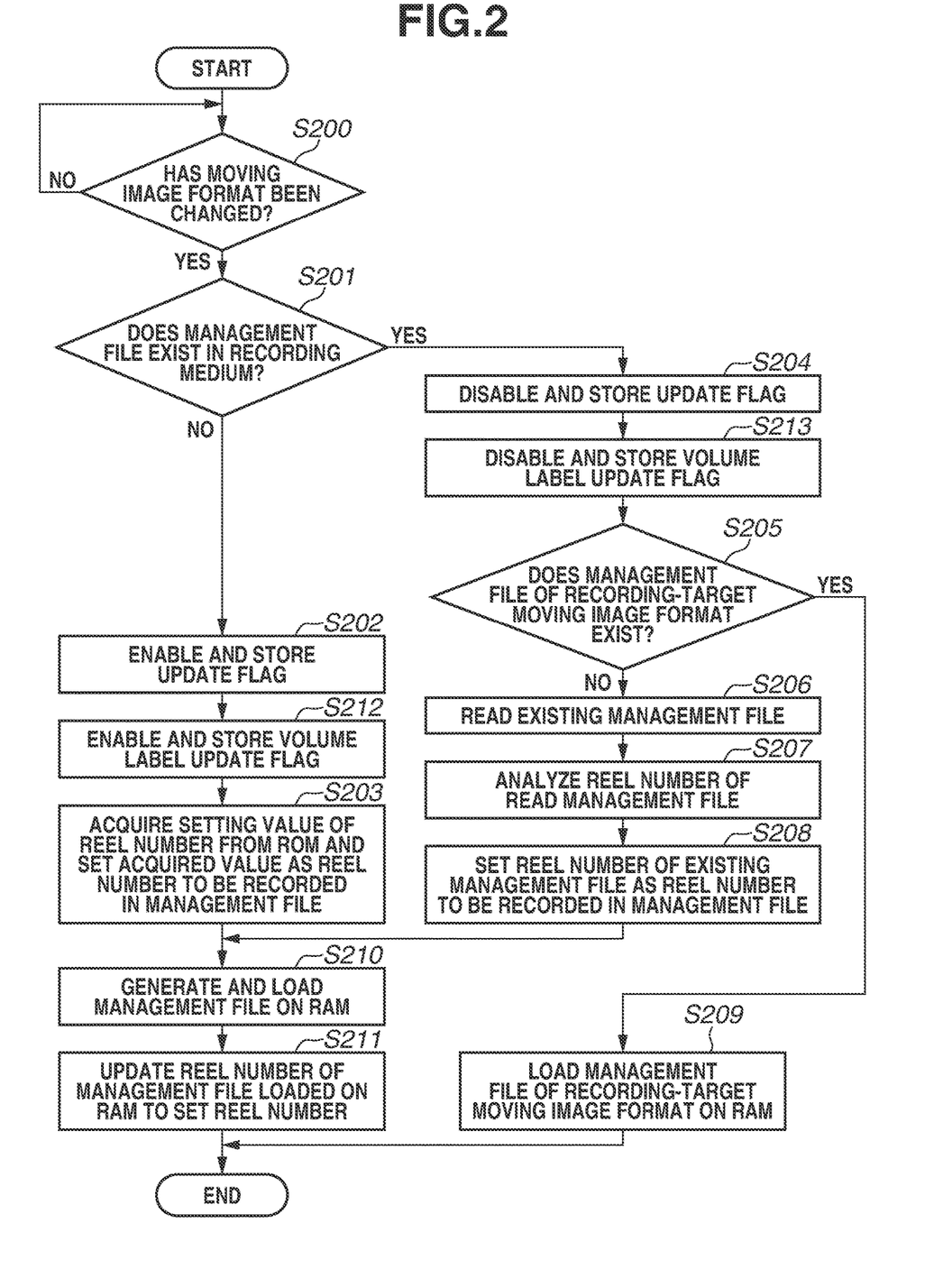
FIG. 2 is a flowchart illustrating management file generation processing executed before recording of a moving image is started.

In step S301, the CPU 102 additionally writes the information about the moving image file generated in step S300 in the management file previously generated in the RAM 104 through the processing in FIG. 2 before receiving a recording instruction of the moving image. The CPU 102 additionally writes the information about a file name of the moving image file generated in step S300 in a region (i.e., region 403 or 413 in FIG. 4B) for recording the information about a moving image file within the management file stored in the RAM 104. The information about a moving image file recorded in the management file is not limited to the file name, and an imaging date/time or a recording time may be also recorded. Then, the processing proceeds to step S302.

In step S302, the CPU 102 refers to the RAM 104 and determines whether the update flag that indicates whether a setting value of the reel number is to be updated and a volume label update flag that indicates whether a volume label is to be updated, which are recorded in the ROM 103, are enabled. In the present exemplary embodiment, the update flag of the reel number and the volume label update flag are changed in association with each other as described in steps S202, S212, S204, and S213. Accordingly, the CPU 102 may make a determination on only one of the update flags. If the CPU 102 determines that the update flag is enabled (YES in step S302), the processing proceeds to step S303. If the CPU 102 determines that the update flag is disabled (NO in step S302), the processing proceeds to step S306 without executing the processing in steps S303 to S305 and S308 to S309. In step S306, the CPU 102 executes processing for writing the management file loaded on the RAM 104 into the recording medium 110.

In step S303, the CPU 102 acquires a setting value of the reel number recorded in the ROM 103. Then, the CPU 102 updates the reel number of the management file loaded on the RAM 104 with the acquired reel number. Since the processing similar to this processing is executed in steps S203 and S211 of FIG. 2, the processing can be also executed in either of step S203 or step S211.

Subsequently, in step S304, the reel number setting unit 112 increments the setting value of the reel number recorded in the ROM 103. Then, in step S305, the CPU 102 disables the update flag stored in the RAM 104. With this processing, the setting value of the reel number recorded in the ROM 103 is not updated from the next time when the moving image file is recorded. Further, when the setting value of the reel number recorded in the ROM 103 is used to update the setting value of the reel number recorded in the ROM 103, the reel number will be different from the current reel number.

In step S308, the CPU 102 determines the volume label of the recording medium 110 and rewrites the volume label recorded in the recording medium 110. The volume label includes at least a camera ID and a reel number. When the volume label is determined, the CPU 102 acquires and uses, as the camera ID and the reel number, a setting value of the camera ID recorded in the ROM 103 and the reel number updated in step S303. In the present exemplary embodiment, a character string in which one of the letters of the camera ID is combined with the reel number is determined as the volume label of the recording medium 110, and the determined volume label is recorded in the recording medium 110.

Then, in step S309, the CPU 102 disables the volume label update flag stored in the RAM 104. With this processing, update of the volume label is not executed from the next time when the moving image file is recorded.

In step S306, the recording control unit 109 writes the management file loaded on the RAM 104 to the recording medium 110. Therefor in a case where a new management file is generated and temporarily stored in the RAM 104 in steps S210 and S211, the management file is newly recorded in the recording medium 110 in step S306, and in a case where a management file read from the recording medium 110 and temporarily stored in the RAM 104 in step S209, the management file recorded in the recording medium 110 is updated in step S306. Then, in step S307, the recording control unit 109 writes the moving image file generated in step S300 and stored in the RAM 104 to the recording medium 110. In the above-described exemplary embodiment, although the management file is recorded in the recording medium 110 before the moving image file is recorded, either of these files can be recorded first. Further, the processing in steps S301 to S306 may be executed in concurrence with recording of the moving image file in the recording medium 110.

By executing the above-described processing, even if the management file is generated for each moving image format, a camera ID that can be identified from a volume label is not changed in the middle. Thus, it is possible to identify the camera ID that is recorded when the first moving image format is recorded, and information about the same reel number is recorded in the management files in the same recording medium. Further, in a case where no management file is recorded in the recording medium 110, a setting value previously recorded in the ROM of the image recording apparatus is used as the reel number to be recorded in the management file. Since determination about the reel number and generation of the management file are executed before recording of the moving image is executed, processing delay that can occur when recording of the moving image is executed can be prevented. Then, because a setting value of the reel number in the ROM is incremented only when the management file that includes the reel number is to be recorded in the recording medium, a reel number different from the current reel number can be set when the setting value of the reel number in the ROM is used next time.

While the present disclosure has been described in detail with reference to the exemplary embodiments, it is to be understood that the present disclosure is not limited to the above-described specific exemplary embodiments, and many variations which do not depart from the essential spirit of the present disclosure should be also included within the scope of the present disclosure. Further, a part of the above-described exemplary embodiments may be combined as appropriate.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, the scope of the following claims are to be accorded the broadest interpretation so as to encompass all such modifications and equivalent structures and functions.

This application claims the benefit of Japanese Patent Applications No. 2018-069287, filed Mar. 30, 2018, and No. 2018-217583, filed Nov. 20, 2018, which are hereby incorporated by reference herein in their entirety.

What is claimed is:

1. An image recording apparatus, comprising:
   a setting unit configured to set a recording format of a moving image from among a plurality of recording formats;
   a determination unit configured to determine a reel number of a recording medium based on information retained in the image recording apparatus; and
   a recording control unit configured to execute control to generate a management file of a recording format set by the setting unit, the management file including information about the reel number determined by the determination unit and to record the management file of the recording format in the recording medium in a case where the management file of the recording format set by the setting unit is not recorded and a management file of another recording format is not recorded in the recording medium when recording of a moving image of the recording format set by the setting unit is performed,
   wherein, in a case where a management file of a recording format set by the setting unit is not recorded and a management file of another recording format is recorded in the recording medium when recording of a moving image of the recording format set by the setting unit is performed, the recording control unit executes control to generate a management file of the recording format set by the setting unit which includes information about a reel number of the management file of the another recording format and to record the management file of the recording format in the recording medium.

2. The image recording apparatus according to claim 1, wherein, in a case where a management file of any recording format is not recorded in the recording medium, the recording control unit executes control to generate a management file of the recording format set by the setting unit which includes the information about the reel number determined by the determination unit based on information retained in the image recording apparatus and to newly record the management file in the recording medium.

3. The image recording apparatus according to claim 1, wherein, in a case where the management file of the recording format set by the setting unit is not recorded in the recording medium, the recording control unit executes control to record the management file of the recording format set by the setting unit in the recording medium according to an instruction to start recording of a moving image.

4. The image recording apparatus according to claim 1, further comprising:
   a generation unit configured to generate the management file of the recording format set by the setting unit; and
   a storage unit configured to temporarily store the management file generated by the generation unit,
   wherein, in a case where the management file of the recording format set by the setting unit is not recorded in the recording medium, a management file including information about a reel number is generated by the generation unit and stored in the storage unit prior to a recording instruction of a moving image, and the recording control unit executes control to record a moving image file and the management file stored in the storage unit in the recording medium according to the recording instruction of the moving image.

5. The image recording apparatus according to claim 4, wherein, in a case where the management file of the recording format set by the setting unit is not recorded in the recording medium, a reel number to be recorded in the management file of the recording format set by the setting unit is determined when the recording format is set by the setting unit, and a management file including information about the determined reel number is generated by the generation unit and stored in the storage unit.

6. The image recording apparatus according to claim 4, wherein the recording control unit executes control to record the moving image file and the management file stored in the storage unit, to which information about the moving image file is written additionally, in the recording medium according to the recording instruction of the moving image.

7. The image recording apparatus according to claim 1 further comprising an update unit configured to update, when the management file including the information about the reel number determined by the determination unit based on the reel number information set to the image recording apparatus is recorded in the recording medium, the reel number information set to the image recording apparatus.

8. The image recording apparatus according to claim 1, further comprising:
   a volume label determination unit configured to determine a volume label including identification information for identifying the image recording apparatus and the reel number determined by the determination unit; and
   a volume label update unit configured to update a volume label of the recording medium to the volume label determined by the volume label determination unit when the recording control unit newly records a management file in the recording medium.

9. The image recording apparatus according to claim 8, wherein, in a case where the management file of the recording format set by the setting unit is not recorded and the management file of the another recording format is recorded in the recording medium, the volume label update unit does not update the volume label of the recording medium even if the management file is newly recorded.

10. The image recording apparatus according to claim 8, wherein, in a case where a management file is recorded in a state where no management file is recorded in the recording medium, the volume label update unit updates the volume label of the recording medium.

11. The image recording apparatus according to claim 8, wherein the image recording apparatus is a video camera having an image capturing unit for capturing a moving image, and
   wherein the identification information is a camera identification (ID) that can be changed by a user operation.

12. The image recording apparatus according to claim 1, wherein the recording medium is removable from the image recording apparatus.

13. A non-transitory computer-readable storage medium storing a program that causes a computer to execute a control method of and image recording apparatus, the method comprising:
   setting a recording format of a moving image from among a plurality of recording formats;
   determining a reel number of a recording medium based on information retained by the image recording apparatus; and
   executing control to generate a management file of a set recording format, the management file including information about the determined reel number and to record the management file of the recording format in the recording medium in a case where the management file of the recording format set by the setting unit is not recorded and a management file of another recording format is not recorded in the recording medium when recording of a moving image of the recording format set by the setting unit is performed,
   wherein, in a case where a management file of a set recording format is not recorded and a management file of another recording format is recorded in the recording medium when recording of a moving image of the recording format set by the setting unit is performed, control is executed to generate a management file of the set recording format which includes information about a reel number of the management file of the another recording format and to record the management file of the recording format in the recording medium.

* * * * *